United States Patent Office 3,848,025
Patented Nov. 12, 1974

3,848,025
GRAFTED ETHYLENE POLYMERS
Heinrich Alberts, Cologne, and Herbert Bartl, Odenthal-Hahnenberg, Germany, assignors to Bayer Aktiengesellschaft, Leverkusen, Germany
No Drawing. Filed Oct. 10, 1972, Ser. No. 296,050
Claims priority, application Germany, Oct. 14, 1971, P 21 51 237.8
Int. Cl. C08f 15/00
U.S. Cl. 260—878 R
8 Claims

ABSTRACT OF THE DISCLOSURE

1–99% by weight of a mixture of (meth)-acrylonitrile, one or more monoolefins having 2 to 18 carbon atoms and optionally other methacrylic derivatives are grafted on 1–99% by weight of homopolymers of ethylene or copolymers of ethylene with organic vinyl esters or with $\alpha,\beta$-monoolefinically unsaturated carboxylic acid derivatives of carboxylic acids, said acids having 2 to 4 non-carboxyl carbon atoms.

---

This invention relates to graft polymers made up from homopolymers and copolymers of ethylene as graft substrate and a mixture of (meth)acrylonitrile with one or more monoolefins as the grafting monomer, and to a process for their production.

It is known that polyethylene can be used as substrate for grafting reactions. As a rule the monomers of interest for grafting are those which are extremely difficult to copolymerise with ethylene or with which such copolymerisation can be carried out only using special apparatus because they have vastly different copolymerisation parameters. Acrylonitrile is an example of such a monomer. Polyethylenes grafted with acrylonitrile are thus insoluble, frequently crosslinked and extremely difficult if not impossible to process (cf. British Patent Specification No. 814,393).

It is also known that acrylonitrile can be grafted onto ethylene-vinyl acetate copolymers either by swelling the substrate with monomeric acrylonitrile in the presence of a radical forming compound or by dissolving the substrate and monomer in a common solvent and effecting subsequent polymerisation. Unfortunately, this procedure gives incompatible grafted products which are difficult, if not impossible, to process, even when the quantities of grafted-on acrylonitrile are small (cf. "Addition and Condensation Polymerisation Processes" in Advances in Chemistry Series, No. 91, pp. 477–488, Article: Graft Polymerisation of Vinyl Compounds on Ethylene-Vinyl Acetate Copolymers, by Herbert Bartl and Dietrich Hardt).

The object of the invention is to provide compatible, readily processable graft polymers made up from homopolymers and copolymers of ethylene, which graft polymers have an outstanding oil resistance, extremely low permeability to gases and water vapour and improved bond strength.

According to the invention, this object is achieved by using polyethylene or copolymers of ethylene with vinyl esters or with $\alpha,\beta$-mono-olefinically unsaturated carboxylic acid derivatives as the graft substrates, and mixtures of (meth)acrylonitrile, mono-olefins and, optionally, (meth) acrylic acid derivatives as the grafting monomers.

Accordingly, the invention relates to a process for the production of graft polymers of homopolymers of ethylene or copolymers of ethylene with olefinically unsaturated monomers in the presence of a radical former in homogeneous or heterogeneous phase, in which process mixtures of (meth)acrylonitrile, at least one mono-olefin containing from 2 to 18 carbon atoms and, optionally, other (meth)acrylic derivatives are copolymerised in the presence of homopolymers of ethylene or copolymers of ethylene with organic vinyl esters or with $\alpha,\beta$-mono-olefinically unsaturated carboxylic acid derivatives of carboxylic acids containing from 3 to 5 carbon atoms, including the carboxyl groups.

The invention also relates to graft polymers comprising:

from 1 to 99% by weight of ethylene homopolymer of copolymer with organic vinyl esters or with $\alpha,\beta$-mono-olefinically unsaturated carboxylic acid derivatives of carboxylic acids containing from 3 to 5 carbon atoms including the carboxyl groups; and from
99 to 1% by weight of polymerised units of (meth) acrylonitrile, at least one monoolefin containing 2 to 18 carbon atoms and, optionally, further (meth)acrylic derivatives.

In the context of the invention, homopolymers of ethylene are to be regarded as polyethylenes of the kind obtained by known methods of low-pressure, medium-pressure or high-pressure synthesis and which can vary from linear to heavily branched with molecular weights of higher than 5000.

The ethylene copolymers are ethylene-vinyl ester copolymers, preferably having from 1 to 75% by weight, more particularly from 5 to 50% by weight, of incorporated vinyl esters. Suitable vinyl esters include organic vinyl esters of aliphatic saturated monocarboxylic acids having from 1 to 18 carbon atoms, optionally substituted by halogen, especially chlorine, and aromatic monocarboxylic acids having from 6 to 10 non-carboxyl carbon atoms. The following are mentioned specifically: vinyl formate, vinyl acetate, vinyl propionate, vinal $\alpha$-chloropropionate, vinyl n-butyrate, vinyl isobutyrate, vinyl caproate, vinyl laurate, vinyl myristate, vinyl stearate and vinyl benzoate. Viny acetate is preferred.

The ethylene-vinyl copolymers may be prepared by conventional methods of high-pressure or medium-pressure synthesis, optionally in solvents such as tert.-butanol.

The ethylene copolymers also include copolymers of ethylene with $\alpha,\beta$-mono-olefinically unsaturated carboxylic acid derivatives of carboxylic acids having from 2 to 4 non-carboxyl carbon atoms, preferably containing from 1 to 80% by weight, more particularly from 1 to 30% by weight, of these carboxylic acid derivatives.

$\alpha,\beta$-Mono-olefinically unsaturated carboxylic acids having from 2 to 4 non-carboxyl carbon atoms include (meth)acrylic acid, crotonic acid, fumaric acid, maleic acid, itaconic acid, (meth)acrylic acid and maleic acid are preferred.

Carboxylic acid derivatives of the aforementioned acids include carboxylic acid esters having from 1 to 8 carbon atoms in the alcohol moiety, including in the case of the dicarboxylic acids, mono-esters and di-esters; the carboxylic acids themselves; amides which are unsubstituted on the nitrogen atom; and, carboxylic acid anhydrides.

Ethylene homopolymers and ethylene-vinyl ester copolymers, especially ethylene-vinyl acetate copolymers, give the best results when used as graft substrates.

If desired, the ethylene-vinyl ester copolymers can be completely or partly hydrolysed.

Methacrylonitrile and/or acrylonitrile and mono-olefins having from 2 to 18 carbon atoms are uesd as the monomers to be grafted on. The following mono-olefins are mentioned specifically; ethylene, propylene, 1-butene, 2-butene, isobutylene, 2 - methyl - 2-butene, 3-methyl-1-butene, diisobutylene, triisobutylene, 1-pentene, 4-methyl-1-pentene, 1-octadecene and cyclopentene.

It is preferred to use $\alpha$-mono-olefins which contain 2 to 8 carbon atoms, especially propylene, 1-butene or isobutylene. It is also possible to use mixtures of olefins.

(Meth)acrylic acid derivatives may optionally be jointly used as grafting monomers. (Meth)acrylic acid derivatives include esters of (meth)acrylic acid having from 1 to 8 carbon atoms, preferably from 1 to 4 carbon atoms, in the alcohol component, (meth)acrylic acid, (meth)acrylic acid amide and mixtures thereof.

The monomer mixtures to be grafted on comprise from 1 to 99% by weight, preferably from 40 to 90% by weight, of (meth)acrylonitrile and from 99 to 1% by weight, preferably from 60 to 10% by weight, of one or more mono-olefins. From 0 to 50% by weight, preferably less than up to 30% by weight, based on the total quantity of grafting monomers, of (meth)acrylic acid derivatives may be present in the mixture.

The process according to the invention is further distinguished by the use of from 1 to 99% by weight, preferably from 10 to 90% by weight, and more particularly from 20 to 80% by weight, of the monomer mixture and from 99 to 1% by weight, preferably from 90 to 10% by weight, and more particularly from 80 to 20% by weight of ethylene homopolymer or ethylene copolymer.

The graft polymers according to the invention comprise from 1 to 99% by weight, preferably from 15 to 85% by weight, of graft base and from 99 to 1% by weight, preferably from 85 to 15% by weight, of polymerised monomer units.

The graft chains built up by the polymerised monomers comprise from 60 to 99.9% by weight, preferably from 80 to 99% by weight of (meth)acrylonitriles, from 20 to 0.1% by weight, preferably from 10 to 1% by weight, on mono-olefin, and from 39.9 to 0% by weight, preferably from 19 to 0% by weight, of (meth)acrylic acid derivatives, based on a total sum of incorporated monomers of 100% by weight.

The monomers that are substantially grafted on to the graft base. However, smaller quantities (up to 20% by weight) of homopolymers and/or copolymers made up from these monomers may also be present. Further, up to 99% by weight of the graft substrate used can remain unchanged, i.e. ungrafted, where only small quantities of monomer mixture (less than 10% by weight) are used. Accordingly, from 1 to 99% by weight, preferably from 20 to 80% by weight, of the polymers comprises ungrafted ethylene homopolymer or copolymers of ethylene and from 99 to 1% by weight, preferably from 80 to 20% by weight, comprises ethylene homopolymer or copolymers of ethylene which are chemically modified by the grafting reaction.

The graft polymers preferably comprise the combinations recommended above for the preparation.

For grafting, the graft base is preferably present in finely divided or in dissolved form so that as uniform as possible a distribution of the degree of grafting is achieved. However, it is also possible in principle to start with a coarsely granulated polyethylene of the kind formed, for example, during the high-pressure polymerisation of ethylene.

If the grafting reaction is to be carried out in solution (homogeneous phase), it is preferred to use as solvents saturated aliphatic or aromatic hydrocarbons, such as ethane, propane, the isomeric butanes, pentanes, hexanes or mixtures thereof, petroleum ether, light petrol or other petrol fractions, benzene, toluene, the isomeric xylenes and other substituted benzene derivatives, for example, chlorobenzene; halogenated aliphatic hydrocarbons, such as methyl chloride, methylene chloride, chloroform, carbon tetrachloride, trichlorofluoromethane or other chlorofluoro hydrocarbons, trichloroethylene, tetrachloroethylene or difluoroethylene; low-boiling alcohols, such as methanol, ethanol, propanol, isopropanol or the isomeric butanols or dimethyl formamide, preferably tert.-butanol.

However, it is also possible to use the monoolefin in such an excess that it acts as a solvent too.

The graft substrates can be dissolved at temperatures of from about 20 to 120° C. It is of course also possible to use higher temperatures where solvents with relatively high boiling points are used or where the dissolution process is carried out under elevated pressure.

The grafting reaction can also be carried out in heterogeneous phase. In such cases, the graft substrate can be used in the form of granulates, spherical particles, in cylindrical form, flake form, spiral form or in other shapes.

Where the grafting reaction is carried out in heterogeneous phase, the graft substrates are preferably present in powder of granulate form with grain sizes of from about 1$\mu$ to about 3 cm.

The graft substrates can be brought into contact with the monomer mixture by spraying, spreading, dipping or by dispersing the substrate in the monomer mixture, the monomers swelling completely or partly into the substrate. This can be accompanied by an increase in the volume of the substrate particles, their original form remaining substantially intact. For the swelling process and also for the subsequent grafting process, the monomer mixture may be present either undiluted, dissolved in solvents or dispersed in an organic diluent and/or water. The diluents whimh may be used for this purpose correspond to the solvents referred to above for grafting in solution. The guantity and type of the solvent used, the temperature, the pressure and the type of graft substrate will determine whether the substrate particles are completely dissolved or are merely swollen. Naturally, swelling of the substrate particles is accomplished by partial dissolution. However, the fraction of the individual substrate particles dissolved remains substantially within the undissolved fraction of the substrate particles so that, despite the increase in volume, the original form remains intact.

Swelling of the graft substrates can be carried out at temperatures of up to 85° C., optionally in the presence of the polymerisation catalysts.

The graft copolymerisation reaction can be carried out either in homogeneous or in heterogeneous phase at temperatures of from —20° C. to +250° C., preferably at temperatures of from +30° C. to +150° C., under pressures of up to 500 atms., preferably at a pressure of from normal pressure (1 atm.) to 21 atms.

It is also possible to prepare initially a homogeneous phase of the graft substrate, monomer mixture and, optionally, catalyst and/or solvent, to disperse this solution in water, and then to carry out the polymerisation reaction, optionally following the addition of the catalyst.

It is also possible to polymerise the graft substrate particles swollen by the monomer mixture, optionally in the presence of a radical forming compound, the presence of inert or substantially inert gases, such as nitrogen or carbon dioxide.

Where the graft polymerisation reaction is carried out in heterogeneous phase, the swollen graft substrate is preferably present in an organic solvent, in water or in a heterogeneous mixture or a solution of organic solvent and water.

The polymerisation catalysts can be added to the polymerisation mixture before, during or after the dissolution or swelling process.

The polymerisation catalysts are best used in a quantity of from 0.01 to 1.5% by weight, based on the total of the graft substrate and the grafting monomers. These quantities can of course be considerably exceeded.

Peroxy-compounds or radical-yielding azo-compounds can be used as the polymerisation catalysts. The following are mentioned by way of example: benzoyl peroxide, tert.-butyl perpivalate, tert.-butyl peroctoate, tert.-butyl perbenzoate, di-tert.-butyl peroxide, tert.-butyl-perisononanate, diisopropyl percarbonate, dicyclohexyl percarbonate, acetyl cyclohexyl hexanosulphonyl peroxide, azo-bis-isobutyronitrile, etc. Benzoyl peroxide, tert.-butyl perpivalate, tert.-butylperoctoate, dicyclohexyl percarbonate and azo-bis-isobutyronitrile are particularly suitable.

Conventional redox systems which can be made up from peroxy compounds (such as potassium persulphate) and inorganic or organic reducing agents, of the kind described for example in Methoden der Organischen Chemie, Houben-Weyl, 4th edition (1961), vol. 14/1, pp. 263–297, are also suitable for carrying out the graft reaction according to the invention.

Initiator radicals can also be produced by UV-radiation, even in the presence of peroxygen compounds and with or without sensitisers, X-rays, γ-rays or accelerated electrons. It is of course also possible to use additional regulators of the kind normally used for polymerisation reactions.

It is also possible to add to the polymerisation mixtures conventional auxiliary agents such as molecular weight regulators and, in the case of dispersion polymerisation, dispersants, for example ethylene-vinyl acetate copolymers having 45% by weight of vinyl acetate and a high melt index, or polymers of acrylic acid esters.

The process according to the invention can be carried out either continuously or in batches. The grafting reaction can also be carried out in polymerisation screws and the solvent evaporated off from the graft polymer solutions in evaporation screws, falling-film evaporators or spray dryers.

In the process according to the invention, the monomers are grafted on in quantities of up to from 60% to 100%, preferably up to from 80% to 100%.

The composition of the end-products are determined by one and/or two fractional precipitations. To achieve this, the grafted product may be dissolved (for example in dimethyl formamide or in toluene-dimethyl formamide mixtures) and then repeatedly or fractionally precipitated under heat, for example with n-butanol. In this way there are obtained several fraction of ungrafted substrate, grafted substrate and homo- and copolymerized units of the grafting monomers. The nitrogen content of the individual fractions indicates the degree of grafting, whilst the viscosity numbers are a measure of the dependence of the degree of grafting upon the molecular weight. The following information has been derived from physical investigations: Where a high-pressure polyethylene granulate with an average bead diameter of from 0.5 to 0.6 cm. is used as the graft substrate, the beads are found to be grafted even internally. However, the (meth)acrylonitrile content in the internal zone may be sometimes only about half of that in the peripheral zone. In one example, 26.5% by weight of methacrylonitrile were found in the external zone and 16% by weight in the centre. Uniformly grafted products are obtained when the grafting reaction is carried out on a polyethylene powder as the substrate or in homogeneous solution, as a precipitation polymerisation. The ratio of ungrafted to grafted polyacrylonitrile or polymethacrylonitrile of the final product is generally from 1 to 25% by weight in other words by far the greater part of the acrylonitrile used is grafted. On the other hand, the ungrafted graft substrate content is governed to a considerable extent by the molecular weight distribution of the starting material. In the case of materials with a high fraction of low-molecular-weight components, it is primarily the large molecular units that are grafted so that, in individual cases, it is even possible to isolate more than 80% of unchanged graft substrate.

It would appear that the results of these experiments must be interpreted as follows: If grafting is carried out in the presence of the polymerisation-regulating monoolefins, in addition to an increased number of grafting sites graft chains are obtained which are shortened compared with those obtained from polymerisation in the absence of these olefins. This leads to considerably improved compatibility, solubility and favourable processibility in the grafted products.

The products according to the invention accumulate in solution, dispersion or in the form of plastic compositions, depending on whether the graft reaction was carried out in homogeneous or heterogeneous phase. For example, it is possible to obtain directly finely divided thermoplastic powders with an average grain size of less than 500μ which are eminently suitable for use as powder lacquers for a variety of different powder application processes, for example for fluidisation-dip coating, flame spraying, electrostatic spraying, or for rotational moulding.

The products obtained in accordance with the invention are eminently suitable for processing into films, coating materials, adhesives and thermoplastically processible plastics. In this connection, resistance to solvents, surface adhesion and, in some cases, strength properties are all improved, especially where the grafted products contain nitrile and carboxyl groups, in relation to the starting materials used as graft-substrate. The homogeneity of the grafted products is frequently reflected in an outstanding transparency in contrast to mixture of ethylene polymers and the corresponding polymers of acrylic monomers which are known to be incompatible and inhomogeneous.

Providing that the ratios of acrylic monomers to monoolefin, especially those relating to α-olefins containing from 2 to 4 carbon atoms, are suitably selected, it is also possible to prepare foamed products by using the residual monomers as expanding agents.

The percentages quoted in the following examples refer to weight unless otherwise stated. The melt index is always determined according to DIN 53,735 at 190° C. and at a pressure of 2.16 kp.

EXAMPLE 1

3000 g. of granulate of an ethylene-vinyl acetate copolymer with a vinyl acetate content of 45% and a melt index of 3.6 and 1500 g. of acrylonitrile are introduced into a 12-litre-capacity autoclave equipped with stirring mechanism. The air present in the autoclave is flushed out with butane. 3000 g. of butane and 1200 g. of isobutylene are then pumped in. The mixture is then heated to 100° C., a pressure of 16 atmospheres being maintained. After 2 hours, during which a homogeneous solution is obtained, the mixture is cooled to 50° C., the pressure falling to 7 atms. A solution of 15 g. of tert.-butyl perpivalate in 300 ml. of benzene is introduced, and the mixture is stirred at 50° C. for 5 hours. The mixture is then heated to 60° C., and stirred for a further 5 hours. The pressure is 8 atms. After cooling and venting, an elastomeric grafted product is obtained and this can be processed into a sheet.

If all the volatile constituents are removed, 4250 g. of a graft polymer is obtained which is soluble in dimethyl formamide and has a nitrogen content of 7.5% and an oxygen content of 11.6%. Accordingly, 69% of the grafted product comprises the ethylene-vinyl acetate copolymer graft base, and 31% of grafted side chains formed from acrylonitrile and isobutylene. 28% of the grafted polymer are formed from acrylonitrile units, and 3% from isobutylene units. The grafted product has a melt index of 0.22. The material shows considerably improved oil resistance and resistance to tear-propagation compared with the starting material.

EXAMPLE 2

500 g. of acrylonitrile and 5 g. of tert.-butyl peroctoate are introduced into a solution of 4500 g. of an ethylene-vinyl acetate copolymer with a vinyl acetate content of 45% and a melt index of 3.6 in 9000 g. of tert.-butanol in a 40-liter nitrogen filled autoclave. The autoclave is then evacuated and flushed with propylene. 500 g. of propylene are then pumped into the autoclave and a homogeneous solution is obtained. This solution is then stirred at 50° C. under a pressure of 3.5 atms. for 1 hour and then for 8 hours at 80° C./5.5 atms.

After cooling and venting, the solvent is removed by washing with water on a cylinder to form a sheet. After the rough sheet has been dried, 4900 g. of a rubber with an acrylonitrile content of 7.0% and a propylene content of 1% are obtained. The material dissolves in chlorobenzene and dimethyl formamide and has a melt index of 0.96.

As in the following examples, the graft base content of the graft polymer is calculated from the difference between 100% and the sum of the monomers grafted on.

EXAMPLE 3

A graft polymer was prepared as described in Example 2 by reacting 4500 g. of an ethylene-vinyl acetate copolymer containing 45% of vinyl acetate, dissolved in 9000 g. of tert.-butanol, with 2000 g. of acrylonitrile in the presence of 10 g. of tert.-butyl peroctoate and 500 g. of propylene.

5700 g. of a grafted product with an acrylonitrile content of 20% and a propylene content of 1% are obtained. This material dissolves in chlorobenzene or dimethyl formamide and has a melt index of 0.10.

The ethylene-vinyl acetate copolymers used in the examples which contains 45% of incorporated vinyl acetate always have a melt index of 3.6, whereas those containing 8% of incorporated vinyl acetate have a melt index of 5.1 unless otherwise stated.

EXAMPLE 4

3000 g. of an ethylene-vinyl acetate copolymer containing 45% of vinyl acetate and 2000 g. of acrylonitrile are introduced into a nitrogen-filled 40 liters autoclave. The autoclave is then partially evacuated, the air present in it being replaced by propylene. 7500 g. of butane and 2000 g. of propylene are then pumped in. The contents of the autoclave are stirred at 50° C. for 3 hours, a pressure of 9.5 atms. being maintained and a homogeneous solution being formed. A solution of 10 g. of tert.-butyl peroctoate in 100 ml. of petroleum ether is then introduced and the mixture stirred at 80° C. for 3 hours. The pressure is 15.5 atms. Another solution of 10 g. of tert.-butyl peroctoate in 100 ml. of petroleum ether is then added and the mixture stirred at 80° C. for a further 8 hours.

After cooling and venting, a rough sheet is rolled on a grooved roller. After all the volatile constituents have been removed, 4500 g. of a rubber containing 32% of acrylonitrile and 1.5% of propylene are obtained. This material can be rolled on a smooth cylinder to form a tough elastic sheet. The product dissolves in chlorobenzene under heat and in dimethyl formamide. It was not possible to determine the melt index at 190° C. because the material was too hard.

EXAMPLE 5

250 g. of an ethylene-vinyl acetate copolymer with a vinyl acetate content of 45% and 250 g. of acrylonitrile are introduced into a nitrogen-filled 3 litre autoclave. The autoclave is then evacuated and rinsed with isobutylene. 200 g. of isobutylene and 500 g. of butane as solvent are then pumped in. The contents of the autoclave are stirred for 2 hours at 100° C., to form a homogeneous solution which is then cooled to 50° C. A solution of 2.5 g. of tert.-butyl perpivalate in 50 ml. of benzene is then introduced. The mixture is then stirred at 50° C. for 5 hours and at 60° C. for a further 5 hours under a pressure of 4 atms.

460 g. of a graft copolymer with an acrylonitrile content of 44% and an isobutylene content of 2% are obtained. This is soluble in a mixture of tetrachloroethylene and dimethyl formamide. Shaped articles produced from the material are highly transparent, tough and elastic. It was not possible to determine the melt index at 190° C.

EXAMPLE 6

500 g. of an ethylene-vinyl acetate copolymer with a vinyl acetate content of 45% are dissolved in 1000 g. of tert.-butanol in a 12 litre autoclave. A further 4 litres of tert.-butanol, 1000 g. of acrylonitrile and 7.5 g. of tert.-butyl perpivalate are then added. The autoclave is partially evacuated, the air present in it being replaced by propylene. 500 g. of propylene are then pumped in and the contents of the autoclave stirred at 30° C. for 1 hour and then at 60° C./6 atms. for 8 hours. Working up as described in Example 2 gives 1100 g. of a graft polymer with an acrylonitrile content of 51% and a propylene content of 3.5%, which is soluble in dimethyl formamide.

EXAMPLE 7

20 g. of an ethylene-vinyl acetate copolymer with a vinyl acetate content of 45%, 380 g. of acrylonitrile and 6 g. of benzoyl peroxide are dissolved in 1 litre of tert.-butanol in a 3 litre autoclave. The autoclave is repeatedly evacuated and flushed with propylene. 50 g. of propylene are then introduced and the mixture stirred at 50° C. (3 atms.) for 3 hours and then at 85° C. (6 atms.) for 8 hours.

After cooling and venting, the product is isolated by filtration and washing with water. Drying gives 270 g. of a material which is soluble in dimethyl formamide on heating and in a mixture of chlorobenzene/dimethyl formamide (1:2) at 50° C., and which has a melting point of greater than 250° C., turning dark brown in colour above 200° C. It is not possible to isolate any of the starting polymer with such solvents as acetone or ethyl acetate after 24 hours at boiling temperature. The grafted product contains 23.7% of nitrogen and has an acrylonitrile content of 90% and a propylene content of 3%.

EXAMPLE 8

20 g. of an ethylene-vinyl acetate copolymer with a vinyl acetate content of 45%, 300 g. of acrylonitrile and 2.5 g. of azo-bis-isobutyronitrile are dissolved in 1 litre of tert.-butanol in a 3-litre autoclave. The autoclave is repeatedly evacuated and flushed with propylene. 50 g. of propylene are then introduced and the contents of the autoclave stirred at 40° C./4 atms. for 3 hours and then at 75° C./8 atms. for 8 hours. After cooling and venting, the reaction product can be filtered off. It is washed with water and methanol and then dried. 270 g. of a graft polymer which does not contain any ungrafted starting material are obtained (cf. Example 7). The material does not melt at 250° C. and turns dark brown in colour above 200° C. It is soluble in dimethyl formamide and contains 86% of acrylonitrile and 6% of propylene.

EXAMPLE 9

200 g. of an ethylene-vinyl acetate copolymer powder with a vinyl acetate content of 8%, 200 g. of acrylonitrile, 2 g. of tert.-butyl perpivalate and 50 ml. of a 10% dispersant solution (solution of a copolymer of methacrylic acid-methacrylic acid methyl ester 50:50), are introduced into 500 ml. of water in a 3-litre autoclave. The autoclave is partially evacuated, the air present in it being replaced by propylene. 100 g. of propylene are then introduced and the mixture stirred at 30° C. for 3 hours and then at 60° C./12 atms. for 6 hours.

After cooling and venting, the product is isolated by filtration on a suction filter. It is washed free from dispersant with water and then dried. 370 g. of a thermoplast powder which is soluble in dimethyl formamide are obtained. The starting material had been separated from coarse fractions through a 200 μ-sieve; the end product had an average grain size of around 500 μ. The material can be processed into shaped articles which are tough, transparent and hard.

EXAMPLE 10

100 g. of an ethylene-acrylic acid copolymer (acrylic acid content 3.5%; m.p. 118° C.; melt index 8.5), 200 g. of acrylonitrile and 2 g. of azo-bis-isobutyronitrile are introduced into 1 litre of tert.-butanol in a 3 litre autoclave. The autoclave is then partially evacuated, the air present in it being replaced by propylene. 50 g. of propylene are then pumped in and the contents of the autoclave stirred at 50° C./3 atms. for 3 hours and then at 75° C./5 atms. for 10 hours. After cooling and venting, the tert.-butanol is diluted by methanol, followed by filtration of the graft polymer and drying. 298 g. of a graft polymer with an acrylonitrile content of 62% and a propylene content of 4.5% are obtained.

EXAMPLE 11

150 g. of an ethylene-vinyl acetate copolymer with a vinyl acetate content of 45%, 250 g. of acrylonitrile and 1.5 g. of tert.-butyl peroctoate are introduced into a 3 liter autoclave. The autoclave is partially evacuated, the air present in it being replaced by propylene. 100 g. of propylene and 500 g. of butane are then pumped in and the mixture heated to 60° C. at a pressure of 13 atms. When a homogeneous solution has formed after 3 hours, the contents of the autoclave are heated to 80° C., the pressure rising to 19 atms. The contents of the autoclave are then stirred under these conditions for 5 hours and then at 100° C./25 atms. for a further 3 hours. The contents of the autoclave are then cooled with stirring and the autoclave vented. After the unreacted acrylonitrile has been removed, 335 g. of a graft polymer with an acrylonitrile content of 54% and a propylene content of 1% are obtained. The thermoplastic has an average grain size distribution of less than 1000μ, melts at above 122° C. and forms a clear solution in a mixture of chlorobenzene and dimethyl formamide. Films and shaped articles prepared from this powder are transparent.

EXAMPLE 12

500 g. of granulated high-pressure polyethylene (melt index 6.1) and 1000 g. of acrylonitrile are introduced under nitrogen into 5000 ml. of benzene in a 12 litre autoclave. The autoclave is evacuated and flushed with propylene. 500 g. of propylene are then introduced and the contents of the autoclave stirred at 90° C. for 1 hour to form a homogeneous solution, after which a solution of 10 g. of tert.-butylperoctoate in 100 ml. of benzene is introduced. The mixture is then stirred at 90° C./10 atms. for 5 hours and then at 110° C./13 atms. for 5 hours. After cooling and filtration, 950 g. of a graft polymer with 42% of acrylonitrile and 5% of propylene incorporated within it are obtained. The grafted product is soluble in tetrachloroethylene/dimethyl formamide mixtures, melts at 192° C. and can be processed into hard, tough shaped articles.

EXAMPLE 13

4000 ml. of water, 200 ml. of a 10% dispersant solution (as described in Example 9), 3000 g. of granulated high-pressure polyethylene (melt index 6.1), 1000 g. of acrylonitrile, 200 g. ethylene (melt index 6.1), 1000 g. of acrylonitrile, 200 g. of cyclopentene and 5 g. of benzoyl peroxide are introduced into a 12 litre autoclave. The autoclave is evacuated and the air present in it flushed out with nitrogen. The mixture is then stirred at 50° C./3.5 atms. for 5 hours and then at 80° C./4.5 atms. pressure for 5 hours.

After cooling and venting, the grafted granulate, which has retained its original form, is filtered off, washed free from dispersant with water and subsequently dried. 3540 g. of a graft polymer with an acrylonitrile content of 15% and a cyclopentene content of 0.3% are obtained. This material melts at 118° C., is almost completely soluble in a mixture of tetrachloroethylene and dimethyl formamide and can be processed into shaped articles having a high transparency and good surface gloss.

EXAMPLE 14

2000 ml. of water, 100 ml. of a 10% dispersant solution (as described in Example 9), 1000 g. of an ehtylene-vinyl acetate copolymer with a vinyl acetate content of 8% (melt index 5.1) and 400 g. of methacrylonitrile, are introduced into a 6 litre vessel equipped with stirring mechanism. The contents of the vessel are stirred at 40° C. for 3 hours during which period isobutylene is introduced, and a solution of 5 g. of dicyclohexyl percarbonate in 100 ml. of benzene is subsequently added. The mixture is heated to 50° C. and stirred at 50° C. for 5 hours. 1365 g. of a grafted product soluble in Tetralin/dimethyl formamide and with a methacrylonitrile content of 25% and an isobutylene content of 1% (melt index 0.04), are obtained.

EXAMPLE 15

4000 ml. of water, 200 ml. of a 10% dispersant solution (as described in Example 9), 3000 g. of a polyethylene (melt index 6.1), 1000 g. of acrylonitrile and 5 g. of benzoyl peroxide, are introduced into a 12 litre autoclave. The autoclave is partially evacuated, the air present in it being replaced by 1-butene. 300 g. of 1-butene are condensed in, and the mixture stirred at 50° C./5.5 atms. for 5 hours, and then at 80° C./8.5 atms. for 5 hours.

After cooling and venting, the graft polymer is filtered off, washed free from dispersant with water and dried. 3590 g. of grafted product with a melting point of 118° C., an acrylonitrile content of 14%, an incorporated butene content of 2.5% and a melt index of 0.10, are obtained.

EXAMPLE 16

200 g. of polyethylene powder (melt index 6.8), 200 g. of acrylonitrile and 50 ml. of a 20% solution of polyacrylic acid benzyl ester in white spirit are introduced into a 3 litre autoclave equipped with stirring mechanism. The autoclave is partially evacuated, the air present in it being replaced by propylene. 50 g. of propylene and 500 g. of propane are then condensed in and the contents of the autoclave stirred at 80° C./24 atms. for 2 hours, after which 1.0 g. of tert.-butyl peroctoate in 20 ml. of petroleum ether is introduced into the homogeneous solution formed. The mixture is then stirred at 80° C. for 5 hours and then at 90° C./33 atms. for 3 hours. 356 g. of a thermoplast powder soluble in tetrachloroethylene/dimethyl formamide (grain size less than 1000μ) and with an acrylonitrile content of 39%, a propylene content of 4.5% and a melting point of 176° C., are obtained. Oil- and petrol-resistant shaped articles can be obtained from this grafted product.

EXAMPLE 17

4000 ml. of water, 200 ml. of a 10% dispersant solution (cf. Example 9), 200 g. of ammonium sulphate, 500 g. of acrylonitrile, 3000 g. of an ethylene-vinyl acetate copolymer containing 8% of vinyl acetate (melt index 5.1) and 7.5 g. of tert.-butyl perpivalate, are introduced into a 12 litre capacity autoclave. The autoclave is partially evacuated, the air present in it being replaced by isobutylene. 1000 ml. of isobutylene are then introduced at 20° C. and the contents of the autoclave stirred at 30° C./5 atms. for 3 hours and then at 60° C./7 atms. for 5 hours. Working up in the usual way gives 3350 g. of a graft polymer with an acrylonitrile content of 9.8%, an isobutylene content of 0.7%, and a melt index of 0.47.

EXAMPLE 18

4000 ml. of water, 200 ml. of a 10% dispersant solution (cf. Example 9), 5 g. of benzoyl peroxide, 1000 g. of acrylonitrile and 3000 g. of a polyethylene with a melt index of 6.1, are introduced into a 12 litre capacity autoclave. The autoclave is partially evacuated, the air present in it being replaced by isobutylene. 200 g. of isobutylene are then condensed in and the contents of the autoclave stirred at 40° C./5 atms. for 5 hours and then at 85° C./8 atms. for 5 hours. Working up gives 3600 g. of a grafted product which is soluble in Tetralin/dimethyl formamide and has an acrylonitrile content of 15.5%, an isobutylene content of 1.2% and a melt index of 0.20.

EXAMPLE 19

200 g. of an ethylene-vinyl acetate copolymer containing 45% of vinyl acetate (melt index 3.6), 200 g. of acrylonitrile, 100 g. of ethyl acrylate and 3.0 g. of azobis-isobutyronitrile, are dissolved in 1 liter of tert.-butanol in a 3 litre autoclave. The autoclave is partially evacuated, the air present in it being replaced by propylene. 50 g. of propylene are then introduced and the contents of the autoclave stirred at 50° C./3 atms. for 3 hours and then at 75° C./7 atms. for 10 hours. After cooling and venting, the tert.-butanol is washed out with water on to a cylinder and the water-moist sheet dried. 425 g. of a graft polymer with an acrylonitrile content of 38%, an ethyl acrylate content of 15% and a propylene content of 1.5%, are obtained. The melt index is 0.13.

EXAMPLE 20

300 g. of granulated ethylene-vinyl acetate copolymer containing 8% of vinyl acetate (melt index 5.1), 200 g. of an ethylene-vinyl acetate copolymer containing 45% of vinyl acetate (melt index 3.6) and 1000 g. of acrylonitrile, are introduced into 5000 cc. of benzene in a 12 litre autoclave. The autoclave is evacuated and flushed with propylene. 500 g. of propylene are then introduced and the contents of the autoclave stirred at 85° C./8.5 atms. for 2 hours, to form a clear solution. The contents of the autoclave are then cooled to 50° C., and a solution of 7.5 g. of tert.-butyl perpivalate in 100 ml. of benzene is then introduced. The mixture is then stirred at 50° C./6 atms. for 5 hours and then at 70° C./7 atms. for 2 hours. The contents of the autoclave are then cooled while stirring, the autoclave vented, methanol added to the benzene solution, and the product filtered and dried. 940 g. of a graft copolymer with an acrylonitrile content of 43% and a propylene content of 4.5% are obtained. The melt index at 190° C. cannot be measured. Inspite of this, it is possible to produce from the grafted product at 170° C. homogeneous, transparent and tough shaped articles which have an outstanding resistance to oil.

EXAMPLE 21

100 g. of an ethylene-vinyl acetate copolymer containing 45% of vinyl acetate (melt index 3.6), 200 g. of acrylonitrile and 3.0 g. of azo-bis-isobutyronitrile are introduced into 1 litre of tert.-butanol in a 3 litre autoclave. The autoclave is evacuated and repeatedly rinsed with ethylene. The mixture is then heated to 50° C. and ethylene introduced up to a pressure of 100 atms. Stirring is then effected under these conditions for 3 hours. The homogeneous solution is then heated to 75° C., the ethylene pressure raised to 300 atms. and the mixture stirred for 10 hours. After cooling and venting, the graft polymer precipitated is washed out with methanol and dried, giving 222 g. of a grafted product which has a melt index of 0.41. This material contains 50% of incorporated acrylonitrile and 5% of incorporated ethylene units.

EXAMPLE 22

2000 g. of an ethylene-vinyl acetate copolymer containing 45% of vinyl acetate (melt index 3.6), 200 g. of acrylic acid, 1000 g. of acrylonitrile and 10 g. of benzoyl peroxide are introduced into 5000 cc. of tert.-butanol in a 12 litre autoclave. The autoclave is evacuated and flushed with propylene. 300 g. of propylene are then introduced and the contents of the autoclave stirred at 50° C./3.5 atms. for 3 hours and then at 85° C./6.0 atms. for 10 hours. The contents of the autoclave are then cooled while stirring, the autoclave vented, tert.-butanol and the residual monomers are removed with the aid of a screw evaporator. 2650 g. of a graft copolymer with an acrylonitrile content of 21.7%, a propylene content of 0.75% and an acrylic acid content of 2.6% are obtained. The melt is 0.54.

EXAMPLE 23

50 g. of an ethylene-vinyl acetate copolymer containing 45% of vinyl acetate (melt index 3.6), 200 g. of acrylonitrile and 40 g. of methacrylic acid are introduced into 1500 cc. of dimethyl formamide in a 3 litre autoclave. The autoclave is evacuated and flushed with isobutylene. 100 g. of isobutylene are then introduced and the contents of the autoclave stirred at 85° C. for 2 hours, to form a clear solution. The contents of the autoclave are then cooled to 50° C., and a solution of 1.5 g. of tert.-butyl peroctoate in 50 ml. of benzene is then introduced. The mixture is then stirred at 80° C./4 atms. for 4 hours and then at 100° C./6 atms. for 6 hours. The contents of the autoclave are then cooled while stirring, the autoclave vented, water added to the dimethyl formamide solution, and the product isolated and dried. 235 g. of a graft copolymer with an acrylonitrile content of 66%, an isobutylene content of 2.1% and a methacrylic acid content of 10.6% are obtained. The melt index at 190° C. cannot be measured. It is possible to produce from the graft product coatings which have an outstanding adhesiveness and weather resistance.

EXAMPLE 24

1000 g. of an ethylene-vinyl acetate copolymer containing 70% of vinyl acetate (melt index 0.1) and 250 g. of acrylonitirle, are introduced into 5000 cc. of tert. butanol in a 12 litre autoclave. The autoclave is evacuated and flushed with propylene. 100 g. of propylene are then introduced and the contents of the autoclave stirred at 60° C./3.0 atms. for 3 hours. The contents of the autoclave are then cooled to 50° C., and a solution of 3.0 g. of tert.-butyl perpivalate in 100 ml. of tert.-butanol is then introduced. The mixture is then stirred at 60° C./3 atms. for 8 hours. The contents of the autoclave are then cooled while stirring, the autoclave vented, tert.-butanoyl is removed by washing with water on a cylinder to form a sheet. 1180 g. of a graft copolymer with an acrylonitrile content of 14.5% and a propylene content of 0.5% are obtained. The melt index at 190° C. cannot be measured. In spite of this, it is possible to produce from the grafted product at 170° C. homogeneous, transparent and tough shaped articles which have an outstanding resistance to oil.

EXAMPLE 25

250 g. of an ethylene-vinyl acetate copolymer containing 45% of vinyl acetate (melt index 3.6) 150 g. of acrylonitrile and 25 g. of acrylamide, are introduced into 1500 cc. of dimethyl formamide in a 3 litre autoclave. The autoclave is evacuated and flushed with propylene. 100 g. of propylene are then introduced and the contents of the autoclave stirred at 100° C./5.0 atms. for 1 hour. The contents of the autoclave are then cooled to 50° C., and a solution of 0.75 g. of tert.-butyl octoate in 50 ml. of benzene is then introduced. The mixture is then stirred at 100° C./5 atms. for 3 hours and then at 120° C./7 atms. for 6 hours. The contents of the autoclave are then cooled while stirring, the autoclave vented, water added to the dimethyl formamide solution, and the product filtered and dried. 387 g. of a graft copolymer with an acrylonitrile content of 29.7%, a propylene content of 1.5% and an acrylamide content of 4.1% are obtained. The melt index is 0.65.

EXAMPLE 26

400 g. of an ethylene-vinyl acetate copolymer containing 45% of vinyl acetate (melt index 3.6), 200 g. of acrylonitrile and 80 g. of 2-ethylhexyl acrylate, are introduced into 2000 cc. of tert.-butanol in a 6 litre autoclave. The autoclave is evacuated and flushed with butene-1. 50 g. of butene-1 are then introduced and the contents of the autoclave stirred at 80° C./2.0 atms. for 1 hour, to form a clear solution. The contents of the autoclave are then cooled to 50° C., and a solution of 1.2 g. of benzoyl peroxide in 100 ml. of tert.-butanol is then introduced. The mixture is then stirred at 80° C./2 atms. for 8 hours. The contents of the autoclave are then cooled while stirring, the autoclave vented, water added to the tert.-butanol solution, and the product filtered and dried. 625 g. of a soft rubber-like graft copolymer with an acrylonitrile content of 26.4%, a butene-1 content of 1.1% and a 2-ethylhexyl acrylate content of 8.5% are obtained.

What is claimed is:

1. A process for the production of a graft polymer which comprises polymerizing, in the presence of a radical former, in homogeneous or heterogeneous phase, a monomer mixture of
    (a) acrylonitrile, methacrylonitirle or a mixture thereof,
    (b) at least one mono-olefin having from 2 to 18 carbon atoms, and
    (c) 0 to 50% by weight, based on the total monomers, of at least one member selected from the group consisting of acrylic acid and methacrylic acid esters having from 1 to 18 carbon atoms in the alcohol moiety, methacrylamide, acrylic acid and methacrylic acid,
in the presence of a homopolymer of ethylene or a copolymer of ethylene with (i) an organic vinyl ester or with (ii) an $\alpha,\beta$-mono-olefinically unsaturated carboxylic acid or a derivative thereof, said acids having 2 to 4 non-carboxyl carbon atoms.

2. The process of claim 1 wherein (b) is propylene, 1-butene or isobutylene.

3. The process of claim 1 wherein (ii) is derived from an organic carboxylic acid containing from 1 to 17 non-carboxyl carbon atoms.

4. The process of claim 1 wherein (ii) is selected from the group consisting of acrylic acid, methacrylic acid, crotonic acid, itaconic acid, unsubstituted amides and anhydrides of said acids, acrylic acid and methacrylic acid esters having from 1 to 8 carbon atoms in the alcohol moiety, monoesters and diesters of maleic, fumaric and itaconic acid having from 1 to 8 carbon atoms in the alcohol moiety and crotonic acid esters having from 1 to 8 carbon atoms in the alcohol moiety.

5. The process of claim 1 wherein said mixture of monomers comprises from 1 to 99% by weight of (a), from 99 to 1% by weight of (b) and from 0 to 50% by weight of (c), the sum of (a), (b) and (c) being 100%.

6. The process of claim 1 wherein 1 to 99% by weight of said monomer mixture is polymerized in the presence of from 99 to 1% by weight of said homopolymer of ethylene or said copolymer thereof.

7. A graft polymer comprising from 1 to 99% by weight of a homopolymer of ethylene or a copolymer of ethylene with (i) an organic vinyl ester or with (ii) an $\alpha,\beta$-mono-olefinically unsaturated carboxylic acid or a derivative thereof, said acids having 2 to 4 non-carboxyl carbon atoms and from 99 to 1% by weight of polymerized units of
    (a) acrylonitrile, methacrylonitrile or a mixture thereof,
    (b) at least one mono-olefin having from 2 to 18 carbon atoms, and
    (c) 0 to 50% by weight, based on the total monomers, of at least one member selected from the group consisting of acrylic acid and methacrylic acid esters having from 1 to 18 carbon atoms in the alcohol moiety, methacrylamide, acrylic acid and methacrylic acid.

8. The graft copolymer of claim 7 wherein said polymerized units comprise from 60 to 99.9% by weight of (a), from 0.1 to 10% by weight of (b) and from 0 to 39.9% by weight of (c), the sum of (a), (b) and (c) being 100%.

References Cited

UNITED STATES PATENTS

| | | | |
|---|---|---|---|
| 3,742,090 | 6/1973 | Kiuchi et al. | 260—878 R |
| 3,732,336 | 5/1973 | Duke et al. | 260—878 R |

FOREIGN PATENTS

| | | | |
|---|---|---|---|
| 1,111,884 | 5/1968 | Great Britain | 260—878 R |

JOSEPH L. SCHOFER, Primary Examiner

A. HOLLER, Assistant Examiner